United States Patent [19]

Robertson et al.

[11] Patent Number: 5,163,806

[45] Date of Patent: Nov. 17, 1992

[54] AIRLINE FOOD TRANSPORTATION SYSTEM

[76] Inventors: Graham D. Robertson, 7616 Lake Marsha Dr., Orlando, Fla. 32819; Barry J. Walter, 2754 Olive Ave., Fremont, Calif. 94539; Ronald J. Billett, 849 Durshire Way, Sunnyvale, Calif. 94087; John J. Busuttil, Jr., 2179 Stebbins Ave., Santa Clara, Calif. 95051

[21] Appl. No.: 723,104

[22] Filed: Jun. 28, 1991

[51] Int. Cl.⁵ .............................................. B65G 67/02
[52] U.S. Cl. .................... 414/786; 244/137.1; 414/347; 414/499
[58] Field of Search ............... 414/786, 331, 345-347, 414/340, 495, 498, 499, 391-393, 399; 244/137.1, 118.1

[56] References Cited

U.S. PATENT DOCUMENTS

| | | | |
|---|---|---|---|
| 2,498,906 | 2/1950 | Apperson | 414/498 X |
| 2,820,559 | 1/1958 | Armitage | 414/498 |
| 3,454,172 | 7/1969 | Carr | 414/499 X |
| 3,506,144 | 4/1970 | Carder et al. | 414/495 X |
| 3,559,831 | 2/1971 | Westor | 414/499 X |
| 4,009,792 | 3/1977 | Sano et al. | 414/499 X |
| 4,049,135 | 9/1977 | Glassmeyer | 414/399 X |
| 4,084,714 | 4/1978 | Williams | 414/498 |
| 4,221,536 | 9/1980 | McFee | 414/499 X |
| 4,571,205 | 2/1986 | Zaruba et al. | 414/495 X |
| 4,701,097 | 10/1987 | Sturtz | 414/495 |
| 4,907,692 | 3/1990 | Sogge | 198/780 |
| 5,106,259 | 4/1992 | Anderson et al. | 414/331 X |

FOREIGN PATENT DOCUMENTS

2172873 10/1986 United Kingdom ................ 414/399

Primary Examiner—David A. Bucci
Attorney, Agent, or Firm—Michael Lee; R. C. Kamp; R. B. Megley

[57] ABSTRACT

The invention provides a plurality of tray cart containers, in which at least four tray carts are loaded into a tray cart container, and a trailer, wherein the trailers have at least one powered conveyor system, and wherein at least four of tray cart containers are loaded onto the powered conveyor system. A tractor unit is attached to the trailer and transports the trailer from a kitchen to an airport. A container loader removes the tray cart containers from the trailer and transports them to an airplane. The tray carts are removed from the tray cart containers and placed in the airplane kitchen. Other tray carts are removed from the airplane and placed in the tray cart containers. The container loader loads the tray cart containers into the trailer. The trailer is transported from the airport to the kitchen.

7 Claims, 7 Drawing Sheets

FIG_1

FIG_2

FIG_9

FIG_4

AIRLINE FOOD TRANSPORTATION SYSTEM

The invention provides apparatus and a method of transporting food from a kitchen to aircraft.

In the prior art, food is transported from a kitchen to an airplane in trays that are in tray carts loaded in a small delivery truck, where each tray cart would be individually secured. The truck would drive from the kitchen to an airport and to an individual airplane. The truck would dock at the side of the airplane and the individual tray carts would be loaded into the airplane. Other tray carts would be removed from the airplane and would be individually secured. The prior art system of food transportation would require several trips between the kitchen and the airport, several additional people, several specialized trucks, and a slow response time to changes in airplane scheduling.

An object of the invention is to provide a more efficient and less expensive system of transporting food from a kitchen to aircraft.

These and other advantages of the invention will become apparent from the following description of the embodiments and accompanying drawings.

The invention provides a plurality of tray cart containers, in which at least four tray carts are loaded into a tray cart container, and a trailer, wherein the trailers have at least one powered conveyor system, and wherein at least four of tray cart containers are loaded onto the powered conveyor system. A tractor unit is attached to the trailer and transports the trailer from a kitchen to an airport. A container loader removes the tray cart containers from the trailer and transports them to an airplane. The tray carts are removed from the tray cart containers and placed in the airplane kitchen. Other tray carts are removed from the airplane and placed in the tray cart containers. The container loader loads the tray cart containers into the trailer. The trailer is transported from the airport to the kitchen.

Figure 1:
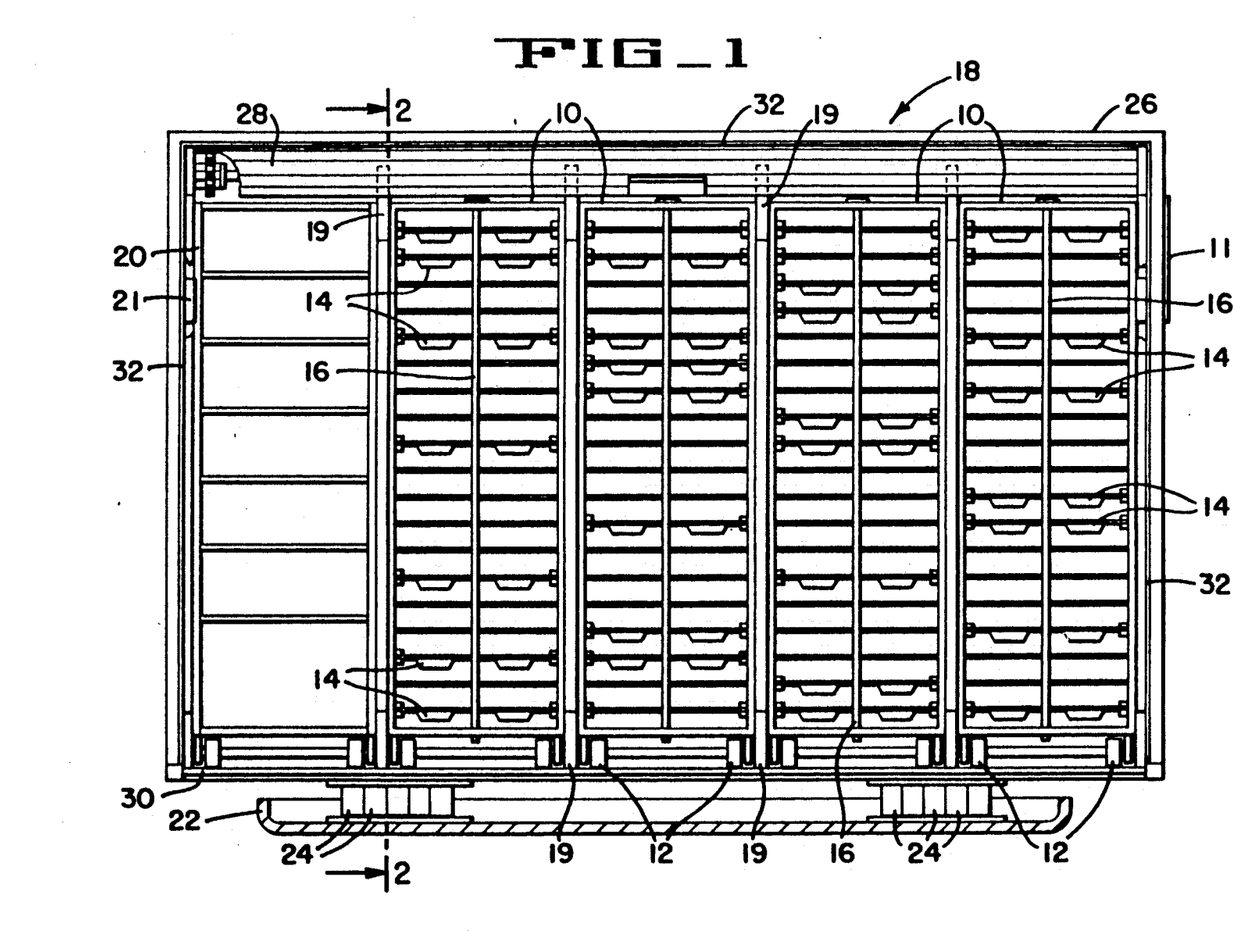
FIG. 1 is a side elevational view of a tray cart container.
Figure 2:
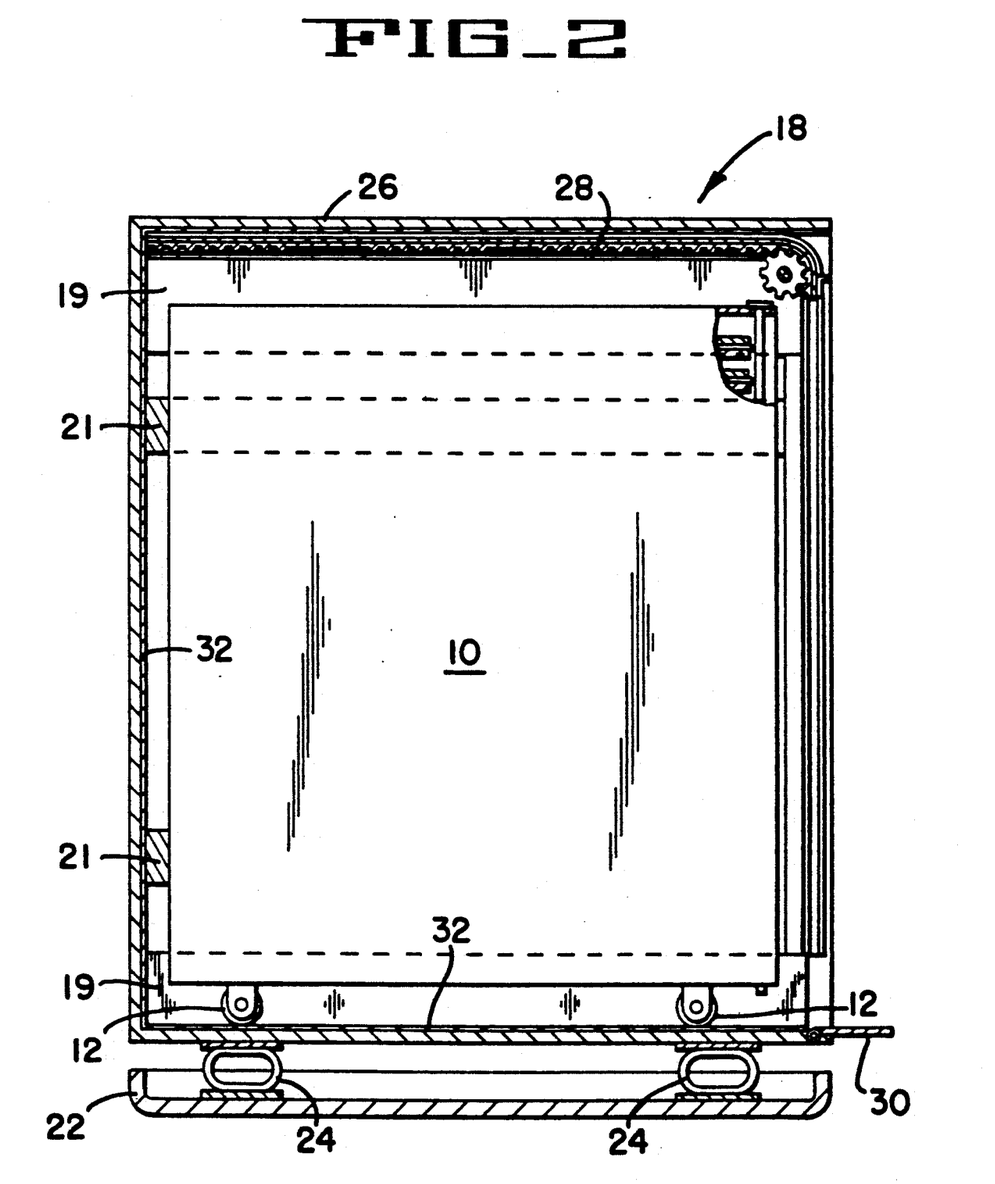
FIG. 2 is a section of the tray cart container taken along lines 2—2.

FIG. 1 illustrates a tray cart container 18 holding four tray carts 10 and a cart 20 with shelves or bins to hold miscellaneous items. FIG. 2 illustrates a side view of the cart container 18 in FIG. 1 taken along lines 2—2. The tray carts 10 are used in the prior art to hold food trays served on airplanes. The tray carts 10 have wheels 12 on which the tray carts 10 roll. Food trays 14 are placed in the tray carts 10 as shown. Rods 16 or doors are used to secure the trays 14 in the tray carts 10. The tray carts 10 used in this embodiment of the invention have an external height of approximately 4 feet, a length of approximately 3 feet and a width of approximately 1 foot. The tray carts 10 each hold approximately twenty trays 14. The cart container 18 has a flat foot 22 to allow the cart container 18 to be moved on a conveyor system. Mounted on the flat foot 22 the cart container 18 has shock mounts 24 to absorb shocks to the flat foot 22. The shock mounts 24 in this embodiment are tubular pieces of rubber, which help to prevent food from spilling out of the food trays or being jumbled on the tray when shocks are encountered. The shock mounts 24 could also be made from metal springs or some other shock absorbing material. Mounted on the shock mounts 24 is a container body 26, which holds the tray carts 10. The container body 26 has in its front an upper door 28 and a lower hinge-down door 30 that becomes a ramp across which the tray carts 10 are rolled. The upper door 28 is illustrated in an open position and can be pulled down to cover the open front of the container body 26. The hinge-down door 30 is partially open in FIGS. 1 and 2 to allow observation of the shock mounts 24 and the wheels 12 of the tray carts 10. The container body 26 is weather proof keeping out water and provides insulation 32. A tag 11 on the side of the container body 26 allows identification of the container specifying container contents or the flight for which the container is prepared. Interior guide rails 19 guide the tray carts 10. Interior bumpers 21 act as additional shock absorbers. The interior of the container body 26 has a height of approximately 4 feet, a length of approximately 5.5 feet and a width of approximately 3 feet, allowing the tray cart container 18 in this embodiment of the invention to hold either four tray carts 10 and a cart 20 of shelves or bins, or five tray carts 10.

Figure 3:
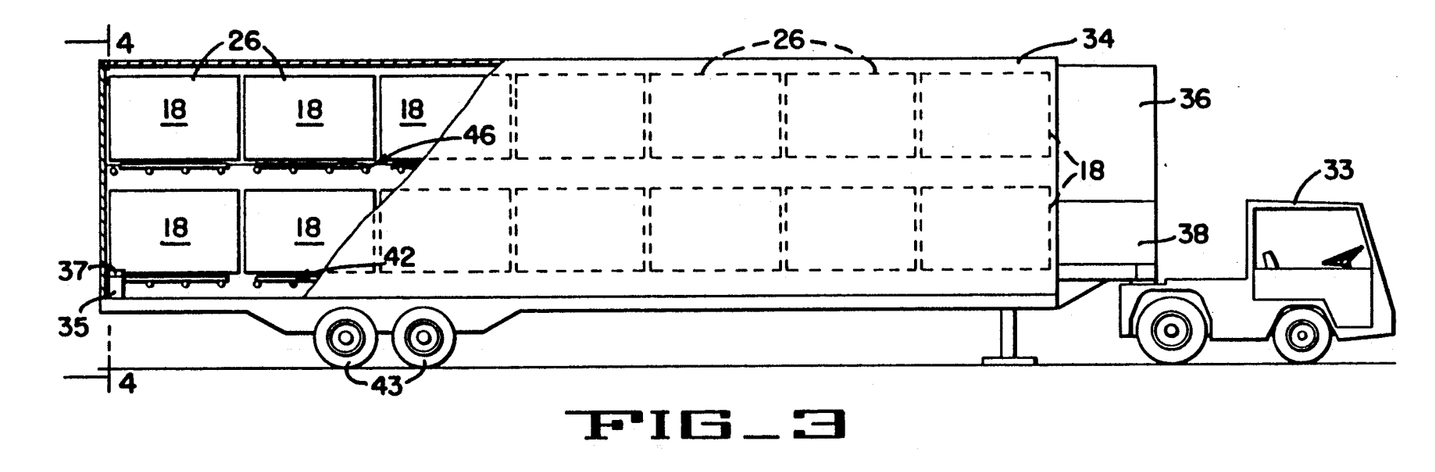
FIG. 3 illustrates a tractor trailer and tractor unit.
Figure 4:
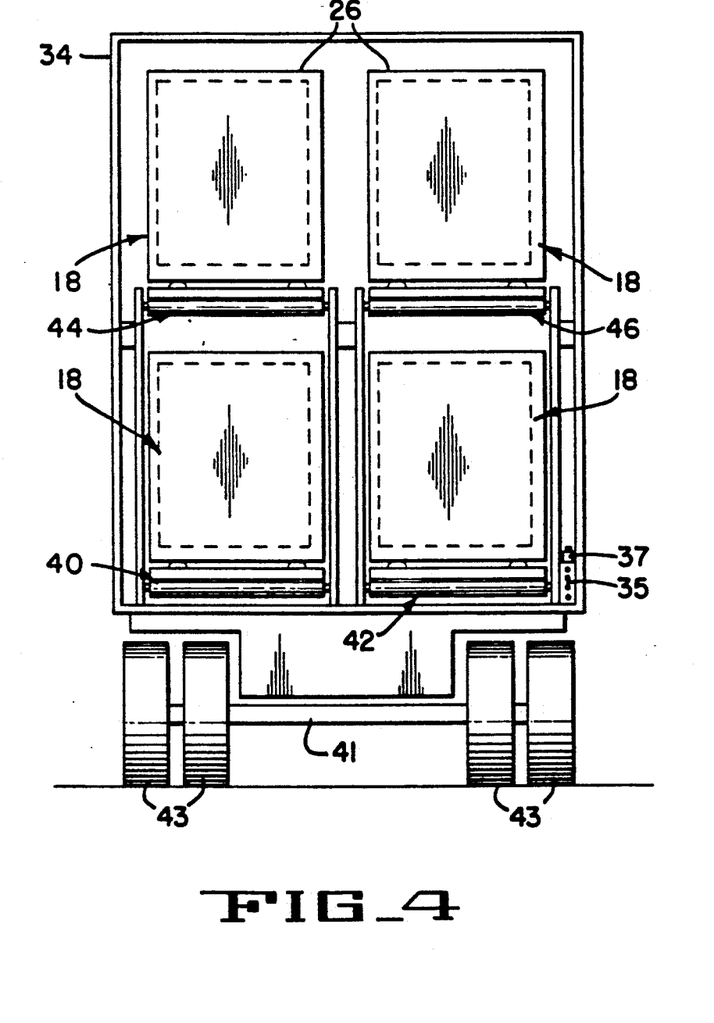
FIG. 4 is a section of the tractor trailer in FIG. 3 taken along lines 4—4.

FIG. 3 illustrates a tractor trailer 34, which has outside dimensions of approximately 50 feet long, 16 feet high, and 8.5 feet wide and is attached to a tractor unit 33. The trailer 34 has an environmental control unit 36, which controls the temperature and humidity inside the trailer 34 and an auxiliary power unit 38, which powers the environmental control unit 36 and other interior mechanisms. FIG. 4 provides an end view of the trailer 34, along lines 4—4. The bottom of the interior of the trailer 34 has a first powered conveyor 40 running the length of the trailer on a first side of the trailer 34 and a second powered conveyor 42 running the length of the trailer 34 on a second side of the trailer 34. Above the first powered conveyor 40 at a height higher than the height of a tray container is a third powered conveyor 44 running the length of the trailer 34 on the first side of the trailer 34. Adjacent to the third powered conveyor 44 is a fourth powered conveyor 46 running the length of the trailer 34 on the second side of the trailer 34. The powered conveyors 40, 42, 44, 46 are controlled by a trailer control panel 35, which has a trailer pendant 37 that is linked by a wire 39, shown in FIG. 5, to the control panel 35 and allows conveyors 40, 42, 44, 46 to be controlled at a distance from the trailer control panel 35. The interior dimensions of the trailer 34 allow seven cart containers 18 to be loaded lengthwise on each conveyor 40, 42, 44, 46. Therefore the trailer 34 can hold as many as twenty-eight cart containers 18, which could supply as many as nine narrow body airplanes. The tractor trailer is supported by an axle 41 with wheels 43.

Figure 5:
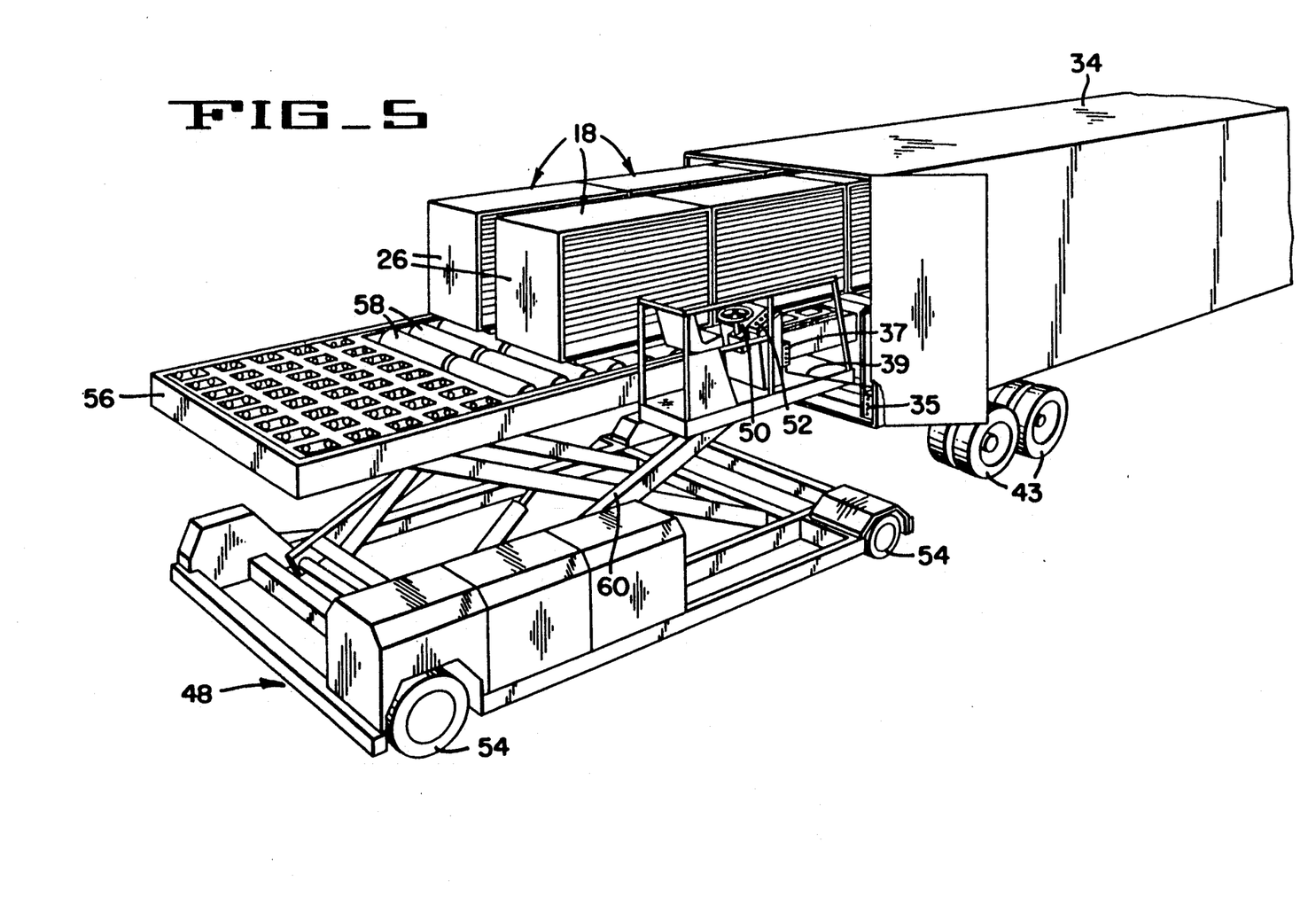
FIG. 5 is a perspective view of a modified Commander TM transporter loader unloading tray cart containers from a trailer.
Figure 6:
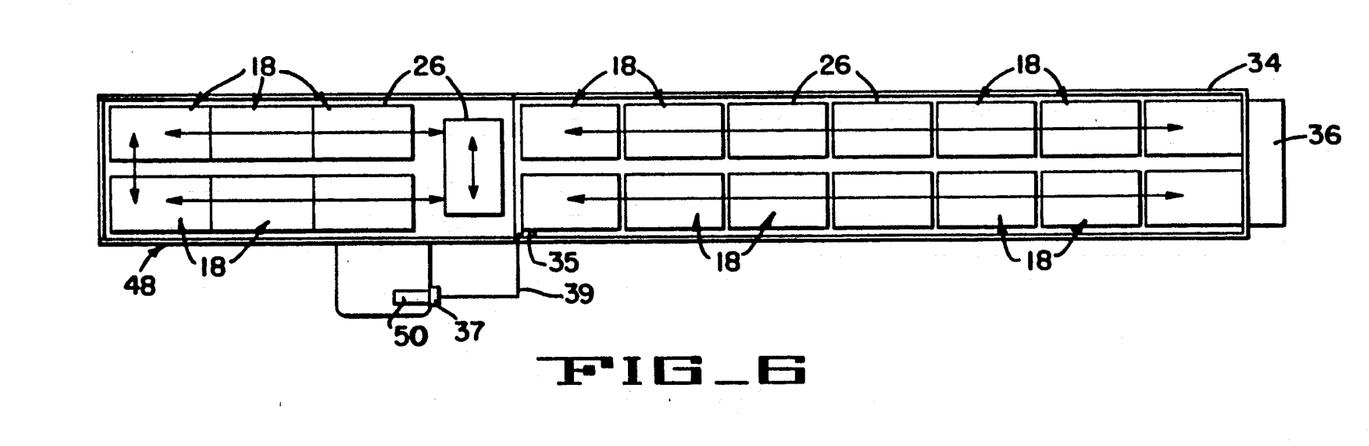
FIG. 6 is a schematic plan view of a Commander TM transporter loader and tractor trailer.

FIG. 5 is a perspective view of a modified Commander TM transporter loader 48 unloading tray cart containers 18 from the trailer 34. The modified Commander TM transporter loader 48, comprises a loader control panel 50, a loader control pendant 52, wheels 4, a platform 56 to support the cart containers 18, means 58 on the platform 56 for moving the cart containers 18 around the platform 56, and means 60 for lowering and raising the platform. FIG. 6 illustrates a schematic cut away plan view of a modified Commander TM transporter loader 48 and a trailer 34 each with a full load of cart containers 18. The modified Commander TM transporter loader 48 in this embodiment of the invention can hold seven or eight cart containers 18. By loading only seven cart containers 18, which is the number of cart containers on each conveyor in the trailer 34, the modified Commander TM transporter loader 48 can cyclically move the cart containers 18 around, to provide any desired cart container 18 to the front of the modified Commander TM transporter loader 48. The ability to rotate the cart containers may be provided by a Heli-Roll TM system described in U.S. Pat. No. 4,907,692. This allows the Commander TM transporter loader 48 to provide immediate access to any cart container 18 anywhere in the trailer 34 and allow access to the cart containers 18 in any desired order. In this embodiment the operator has placed the pendant 37 of the trailer 34 near the Commander TM transporter loader 48 control panel 50 allowing a single operator to control the conveyors 40, 42, 44, 46 in the trailer 34 and the Commander TM transporter loader 48 at one location.

Figure 7:
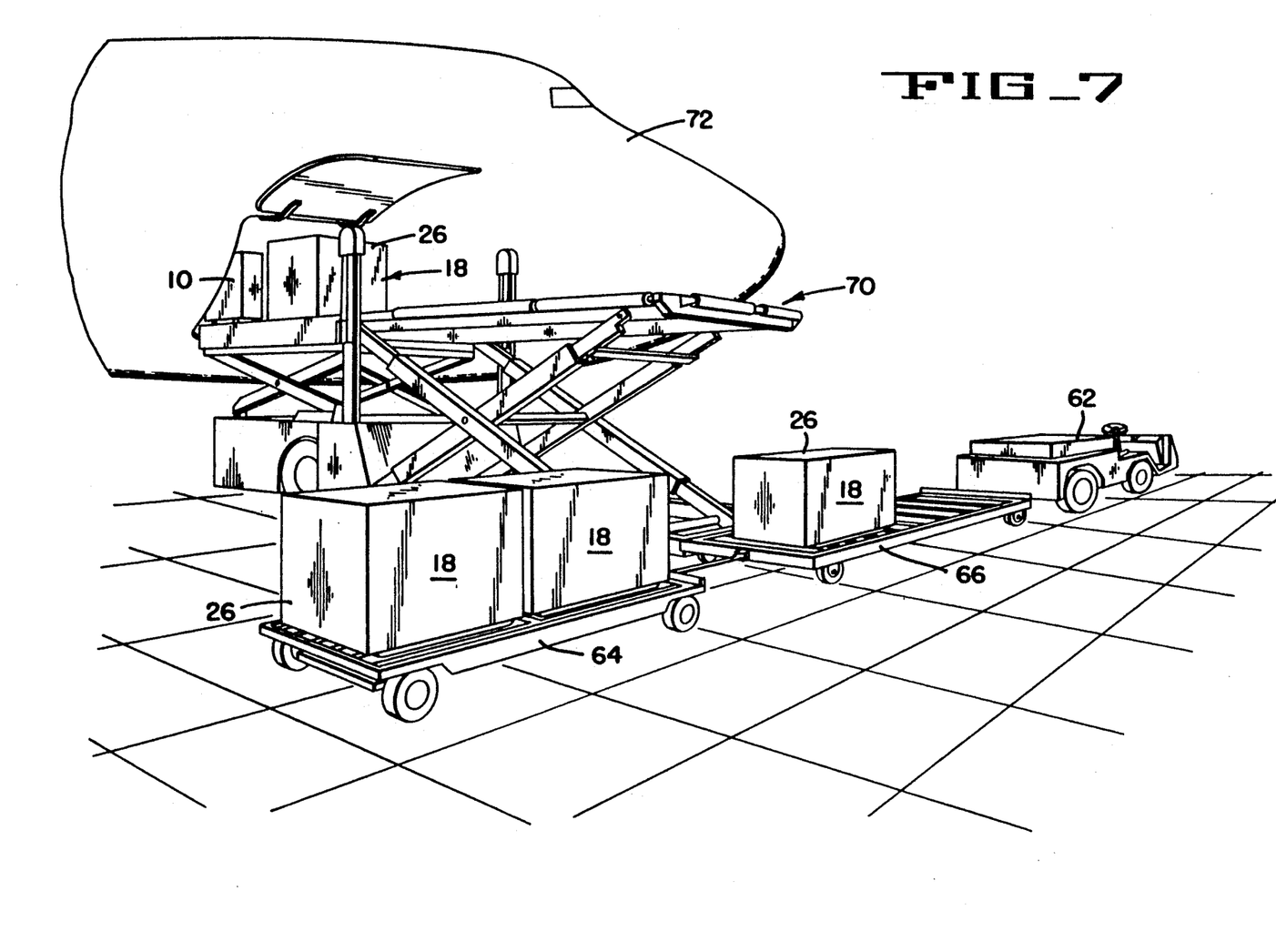
FIG. 7 illustrates a baggage tractor, a baggage dolly, and a baggage trailer next to a baggage loader loading an airplane.

FIG. 7 illustrates a baggage tractor 62 towing a baggage trailer 64 and a baggage dolly 66, with the baggage trailer 64 carrying two cart containers 18 and the baggage dolly 66 carrying one cart container 18. FIG. 7 also illustrates a container/pallet loader 70 such as the FMC Model JC/PL-2 container/pallet loader, which has received one cart container 18 from the dolly 66 and is loading tray carts 10 from the cart container 18 into a narrow body airplane 72. The invention allows the use of generic airplane cargo or baggage handling equipment in providing a more efficient means of transporting food to an airplane.

Figure 8:
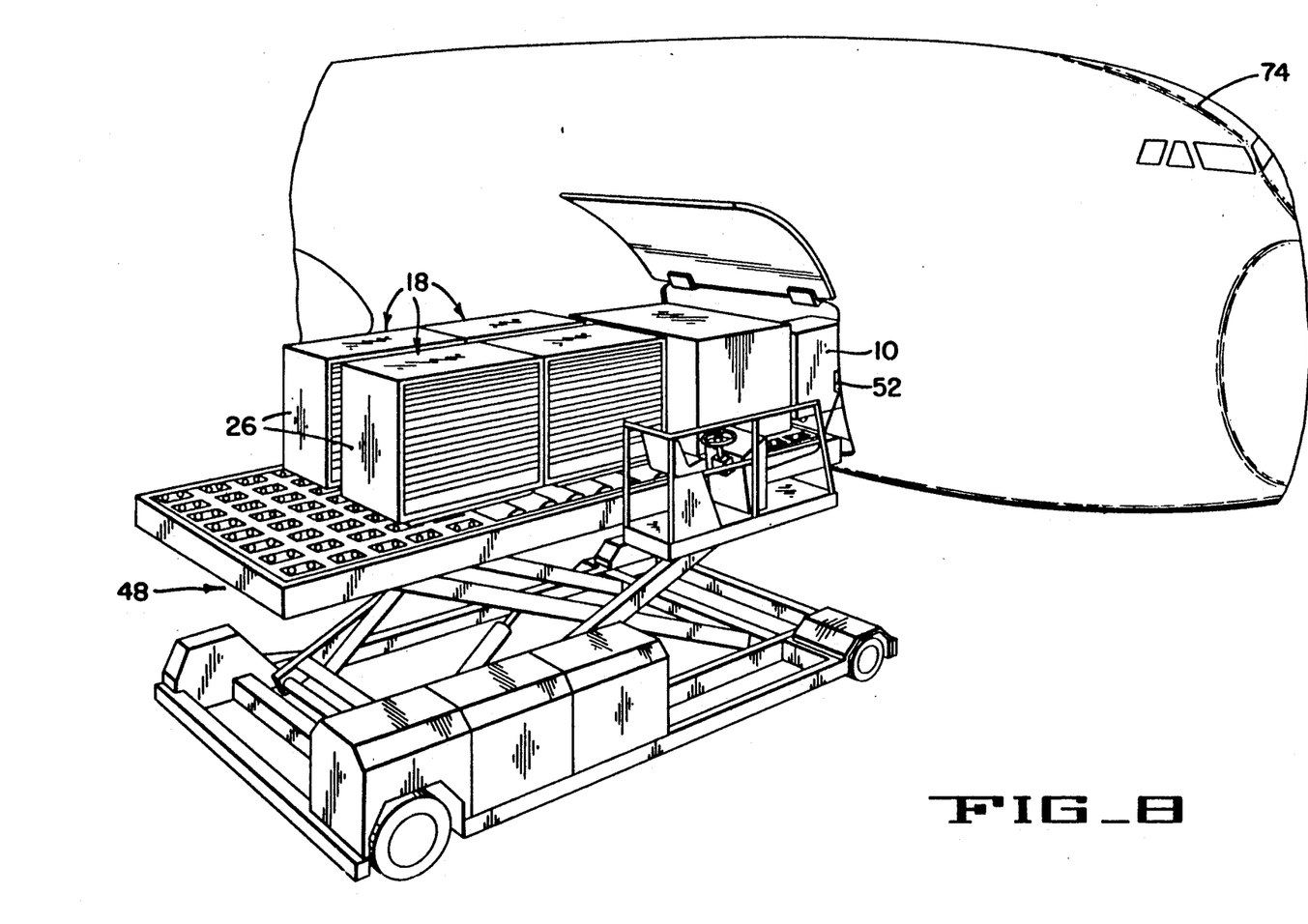
FIG. 8 illustrates a Commander TM transporter loader loading a wide body airplane.

FIG. 8 illustrates the Commander TM transporter loader 48 loading carts from a cart container 18 to a wide body airplane 74. The operator places the loader control pendant 52 at the airplane 74 doorway. The operator can control the placement of the cart containers 18 and remove tray carts 10 from the cart containers 18 from one location near the airplane 74 doorway, allowing the operator to avoid making several trips in and out of the airplane 74.

Figure 9:
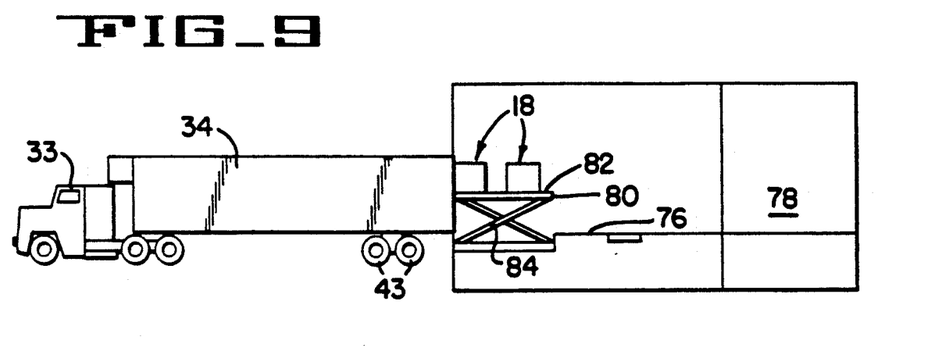
FIG. 9 illustrates tray cart containers being unloaded from a tractor trailer at a kitchen dock.

FIG. 9 illustrates a tractor trailer 34 with cart containers 18 being unloaded at a dock 76 at a kitchen 78. The dock 76 has a dock container loader 80, which comprises a powered conveyor 82 and means 84 for lowering and raising the powered conveyor.

In operation, food trays are placed into tray carts 10, which are placed in cart containers 18, which are tagged at 11 designating the flight for which the food trays were prepared. At the dock 76 the cart containers 18 are loaded into a tractor trailer 34. The trailer 34 is transported to an airport by a tractor unit 33. At the airport the trailer 34 acts as a satellite dock, providing temperature and humidity control to keep the food fresh. Permanent or mobile control centers on the ramp are used to determine flight status. When airplanes are ready to be loaded with the tray carts 10, the control centers notify delivery personnel. The delivery personnel unload the appropriate cart containers 18 from the trailer 34 using a Commander TM transporter loader 48 or some other type of loader 70, and deliver the appropriate cart containers 18 to the airplanes using Commander TM transporter loaders 48, or other type of loader 70, or baggage trailers 64, or dollies 66. A Commander TM transporter loader 48 or some other type of loader 70 may be used to raise a cart container 18 to the door of the airplane. The full tray carts 10 are removed from the cart containers 18 and placed in the airplane. Empty tray carts 10 may be removed from the airplane and placed in the empty cart container 18. For some airplanes, another cart container 18 may be brought to the door of the airplane, and the procedure is repeated. The cart containers 18 are brought back to the trailer 34 and loaded into the trailer 34. The trailer 34 is transported to the kitchen dock, where the cart containers 18 are removed and replaced with other cart containers 18.

In the invention when airplanes are delayed, the dispatcher must merely tell the delivery personnel to leave the cart container 18 in the trailer 34 until the airplanes are ready. In the prior art, if such information was received after the small delivery trucks had left the kitchen the small delivery trucks would either have to return to the kitchen, wasting a trip, or they would have to wait for the airplane to become ready tying up at least one person and a truck during the waiting period and allowing the food to become warmer or colder.

Because cart containers 18 are utilized the invention avoids the wasted operator time used in the prior art to individually secure and release tray carts in the small delivery trucks. Because general baggage equipment is used to load the tray carts into an airplane, only one operator is needed to dock the loader to an airplane door, instead of the two operators needed to dock a small delivery truck near the airplane door. The general baggage equipment provides better visibility than the small delivery trucks, reducing the number of accidents between the vehicle and an airplane. The invention provides a reduction in personnel and specialized equipment. The invention also provides a quicker response time and increased efficiency.

In a worst case scenario with the prior art, an airport complex that has delays and services 26 narrow body airplanes and 6 wide body airplanes without galley modules and 3 wide body airplanes with galley modules, 41 catering trucks were needed, which would be dispersed from a kitchen a 10 to 15 minute drive from the airport. In addition, the prior art would need 3 roving command vans and 6 supply rooms, with a total of 71 people. The present invention, would require 4 tractor trailers 34 and 3 tractor units 35, which would be dispersed from a kitchen that could be a 10 to 25 minute drive from an airport. In addition, the invention would use two operating vans, 25 transporter loaders, 25 dollies or baggage trailers, and 7 baggage tractors, with a total of 35 people. The invention would require only half the personnel of the prior art. The invention would allow the kitchen to be further from the airport, utilizing less expensive real estate. The invention does not require permanent airport fixtures. The invention requires less trips between the airport and the kitchen, therefore saving fuel. The environmentally controlled trailers and more efficient system of the invention provides fresher food than the prior art. The invention requires only 9 specialized and dedicated vehicles instead of the 44 specialized and dedicated vehicles required by the prior art.

While a preferred embodiment of the present invention has been shown and described herein, it will be appreciated that various changes and modifications may be made therein without departing from the spirit of the invention as defined by the scope of the appended claims.

What is claimed is:

1. A method for transporting trays of food from a first location into an airplane, comprising the steps of:
   loading at least ten food trays into a tray cart which has wheels;
   loading at least four tray carts into a tray cart container;
   loading at least four tray cart containers onto conveyors in a tractor trailer;
   transporting the tractor trailer from the first location to an airport where the airplane is located;
   unloading at least one tray cart container from the tractor trailer with a trailer unloader;
   transporting the tray cart container to the airplane;
   unloading the tray carts from the tray cart container; and
   placing the tray carts in the airplane.

2. A method as claimed in claim 1, further comprising the steps of:
   loading tray carts from the airplane into the tray cart container;
   transporting the tray cart container from the airplane to a tractor trailer;
   loading the tray cart container into the tractor trailer;
   transporting the tractor trailer to the first location;
   unloading the tray cart container from the tractor trailer; and
   unloading the tray cart from the tray cart container.

3. A method as claimed in claim 2, further comprising the step of controlling the temperature and humidity inside the tractor trailer.

4. A method as claimed in claim 3, further comprising the step of insulating the tray cart container.

5. A method as claimed in claim 3, further comprising the step of tagging the tray cart container with information.

6. A method as claimed in claim 2, wherein the transporting of the tray cart container is by baggage loading and transporting equipment.

7. A method as claimed in claim 2, wherein the unloading of the tray cart containers comprises the step of elevating a platform.

* * * * *